(12) United States Patent
Harada

(10) Patent No.: US 7,418,515 B2
(45) Date of Patent: Aug. 26, 2008

(54) DATA COMMUNICATION METHOD, DATA COMMUNICATION SYSTEM AND PROGRAM

(75) Inventor: Atsushi Harada, Yamato (JP)

(73) Assignee: International Business Machines Corporation, Armonk, NY (US)

( * ) Notice: Subject to any disclaimer, the term of this patent is extended or adjusted under 35 U.S.C. 154(b) by 851 days.

(21) Appl. No.: 10/472,313

(22) PCT Filed: Apr. 27, 2001

(86) PCT No.: PCT/JP02/03643

§ 371 (c)(1),
(2), (4) Date: Sep. 18, 2003

(87) PCT Pub. No.: WO02/089425

PCT Pub. Date: Nov. 7, 2002

(65) Prior Publication Data

US 2004/0153491 A1    Aug. 5, 2004

(30) Foreign Application Priority Data

Apr. 27, 2001  (JP)  .............................. 2001-130859

(51) Int. Cl.
*G06F 15/16* (2006.01)
(52) U.S. Cl. ........................ 709/232; 709/233; 709/235
(58) Field of Classification Search .................. 709/232
See application file for complete search history.

(56) References Cited

U.S. PATENT DOCUMENTS 5,696,903 A * 12/1997 Mahany ...................... 709/228
5,920,698 A * 7/1999 Ben-Michael et al. ....... 709/224
6,076,115 A * 6/2000 Sambamurthy et al. ..... 709/250

FOREIGN PATENT DOCUMENTS

JP            11252073 A     12/1999
WO            WO 96/22641    7/1996

OTHER PUBLICATIONS

Cali, Federico et al, "IEEE 802.11 Protocol: Design and Performance Evaluation of an Adaptive Backoff Mechanism," Sep. 2000, IEEE, vol. 18, No. 9, pp. 1774-1786.*
Tian, Qingjiang and Coyle, Edward J. "A MAC-Layer Retransmission Algorithm Designed for the Physical-Layer Characteristics of Clustered Sensor Networks," Nov. 2006, vol. 5, No. 11, pp. 3153-3164.*
Yoon, Chong Ho and Un, Chong Kwan, "Unslotted 1- and pi-Persistent CSMA-CD Protocols for Fiber Optics Bus Networks," Feb. 1994, IEEE, vol. 42, No. 2/3/4, pp. 458-465.*
Ozugur, Timucin, "Weighted Hierarchical Backoff Algorithmm for Wireless Ad Hoc Networks," Nov. 2001, IEEE, vol. 5, pp. 2937-2943.*

* cited by examiner

*Primary Examiner*—Jason Cardone
*Assistant Examiner*—Azizul Choudhury
(74) *Attorney, Agent, or Firm*—Duke W. Yee; Herman Rodriguez; Gerald H. Glanzman

(57) ABSTRACT

To reduce the total amount of reply messages in broadcasting and to make effective use of the bandwidth of a communication route without assuming an error rate in advance.

Data is broadcasted to a plurality of receivers (step 11), then a maximum message length of reply messages from the receivers is calculated (step 13), and a backoff time of the reply messages is calculated (step 14). The maximum message length and the backoff time is sent to the receivers (step 15), then the reply messages having lengths of up to the specified maximum message length are generated by the receivers (step 17), and the reply messages are sent from the receivers at any time within the specified backoff time (step 19).

9 Claims, 6 Drawing Sheets

DATA COMMUNICATION METHOD, DATA COMMUNICATION SYSTEM AND PROGRAM

TECHNICAL FIELD

This invention relates to a data communication method, system, and program. More particularly, this invention relates to a technique effectively applied to a communication scheme capable of simultaneously providing high reliability, high processing speed, and effective use of a communication route in broadcasting for sending identical digital contents to many receivers.

BACKGROUND

In data broadcasting using TCP/IP (Transmission Control Protocol/Internet Protocol) or UDP/IP (User Datagram Protocol/Internet Protocol), such as the Internet, a technique is used in which a sender sends a receipt acknowledgement request to receivers, and each receiver returns a receipt acknowledgement (if the receiver has received all the packets) or retransmission requests (if the receiver failed to receive all the packets) so that loss of transmitted packets (data blocks) can be addressed. Then, the sender, which received the reply message(s), retransmits specified data blocks to the receivers that have sent the retransmission requests, and sends a receipt acknowledgement request as before. Repeating data transmission and a retransmission request in this manner ensures that all the data is eventually received by every receiver, and high reliability of data communication can be maintained.

However, in broadcasting, there are a plurality of receivers for one sender. This may cause congestion of reply messages from the receivers after the sender sends a receipt acknowledgement request. The congestion of reply messages may block execution of other applications or may cause overflow of the communication route with possible loss of reply data.

To avoid such congestion of reply messages, a technique involving setting of a backoff time is employed. That is, the timing with which a reply message is sent from each receiver is made to be a random timing within the backoff time, so that the timings of the receivers are shifted from each other. The timings with which the sender receives the reply messages become random within the backoff time, and this disperses the traffic and reduces the load on the communication route, thereby avoiding the above-mentioned problem.

However, in large-scale broadcasting involving a large amount of reply messages in total, the above-mentioned technique of reply timing dispersion is not sufficient to solve the problem. That is, the above technique has a problem of the increased total amount of reply messages proportional to the number of receivers, and a problem of poor utilization of the bandwidth of return lines.

The loss rate of transmitted blocks (the error rate) depends on a communication system or an actual environment but not on the number of receivers. Accordingly, given a certain error rate, the total number of lost blocks increases in proportion to increase in the number of receivers. Because retransmission requests for lost blocks are included in a reply message and sent to the sender, the total amount of reply messages increases as the total number of lost blocks increases. The conventional technique of reply timing dispersion only shifts the timings but cannot reduce the total amount of reply messages.

Further, the conventional backoff time is obtained by the total amount of reply messages divided by the bandwidth. Because the total amount of reply messages is the product of the average reply message length and the number of receivers (senders of the reply messages), calculation of the backoff time requires the average reply message length to be assumed.

Because a reply message includes retransmission requests and the retransmission requests include numbers of blocks requested to be retransmitted, the reply message length will be long if many blocks are requested to be retransmitted (i.e., if the error rate is high). In contrast, the reply message length will be short if the error rate is low. In other words, the reply message length depends on the error rate. If the actual error rate is higher than the assumed error rate, the average reply message length will be longer than the assumed length, which may cause traffic congestion and possibly leads to overflow. In contrast, if the actual error rate is lower than the assumed error rate, the average reply message length will be shorter than the assumed length, which prevents effective use of the bandwidth of the communication route. That is, communication is completed with delay due to the backoff time that is set unnecessarily longer, although otherwise the processing could be completed earlier. In addition, the error rate may vary, for example in the range from 10% to 0.01% depending on the whether in the case of satellite broadcasting. Therefore, assumption of an optimal error rate in advance is difficult in reality.

An object of the invention is to provide a technique to reduce the total amount of reply messages in broadcasting. Another object of the invention is to provide a technique to make effective use of the bandwidth of a communication route without assuming the error rate in advance. Still another object of the invention is to provide a technique to enhance reliability and efficiency of broadcasting.

In this connection, there is a technique to disperse congesting reply messages, in which retransmission requests are collected once for every fewer blocks transmitted. However, this technique has a problem that the total amount of retransmission requests including their headers increases in contrast. Further, there is a technique to reduce the total amount of reply messages, in which receivers broadcast reply messages and they reduce elements included in their own reply message in response to receipt of the reply messages. However, this technique requires that every receiver has a system capable of broadcasting, and it also involves a problem of increased data distribution time in the cases of systems such as a satellite system. Other techniques to reduce the total amount of reply messages includes a technique using a network topology having a tree-structure in which receivers located at intermediate nodes collect reply messages to reduce redundant elements. However, this technique has a problem that it is limited by a topology. This invention achieves the above-mentioned objects without these limitations.

SUMMARY OF THE INVENTION

The outline of the invention is described as follows. A data communication method of the invention comprises the steps of: broadcasting data to a plurality of receivers; calculating a maximum message length and a backoff time of reply messages to be returned from the receivers in response to the broadcasted data; sending the maximum message length and the backoff time to the receivers; and receiving from each receiver the respective reply message sent at any time within the backoff time and having a length of up to the maximum message length. According to the data communication method of the invention, a sender dynamically calculates an optimal maximum message length and an optimal backoff time for the reply messages for each transmission or reply. Then, the sender informs the receivers of the maximum message length and the backoff time, and the receivers generate the reply messages having lengths of up to the maximum message length and send them within the specified backoff time at random. This can enhance efficiency of data communication by saving the bandwidth of a communication route and enabling optimal use of the communication route.

As to the calculation of the maximum message length and the backoff time, the total amount of the reply messages from all the receivers is predetermined, then the maximum message length is calculated by dividing the total amount by the number of the receivers, and the backoff time is calculated by dividing the total amount by the bandwidth of the communication route. Further, the total amount of data of the reply messages minus the lengths of their headers is made proportional to the number of broadcasted blocks of the data. That is, due to the fact that the number of retransmission requests included in the reply messages will not exceed the number of broadcasted blocks if redundant blocks are eliminated, the total amount of retransmission requests can be limited so as to be on the order of the number of the broadcasted blocks by reducing redundant retransmission requests included in the reply messages. On the other hand, there may be a case where the reply message length assigned to each receiver is shorter than the required length. In this case, each receiver returns a part of its message that would have to be returned. The remaining requests that are not included in the reply message may be included in the reply messages from other receivers, so that they can be assumed to be retransmitted in response to the reply messages from other receivers. Thus, the need to receive all the retransmission requests from all the receivers is eliminated, and the total amount of the reply message can be reduced.

Further, when the reply message is a receipt acknowledgement message or a retransmission request message, the maximum message length Lrm is calculated based on an equation Lrm=Lh+F (Nsb)×MLnac/Nr, and the backoff time Tbo is calculated based on an equation Tbo=Lrm×Nr/BW (wherein Lh is a header length of the reply message, F is an arbitrary function with a variable Nsb, Nsb is the number of the broadcasted blocks, MLnac is an average message length of a retransmission request per block, Nr is the number of the receivers, and BW is the bandwidth of the communication route). F (Nsb) can be exemplified by F (Nsb)=C×Nsb.

If the reply message is assigned an allowable message length defined besides the maximum message length Lrm, wherein the maximum and minimum of the allowable message length is Lpmax and Lpmin respectively, the maximum message length Lrm can be modified as Lrm=Lpmax if Lrm is above Lpmax, or as Lrm=Lpmin if Lrm is below Lpmin. For example, if the length of the content of the message is short relative to the header length, the transmission efficiency of the message decreases. In contrast, if the message length exceeds the limit permitted by the protocol, the message needs to be divided, and the transmission efficiency still decreases. In these cases, an allowable message length may be properly defined, wherein the above-mentioned modification can be applied. Further, if the maximum message length Lrm is above the message length Lworst, which is the longest message length among combinations of lost blocks, Lrm may be modified as Lrm=Lworst. Lworst may be substituted by Nsb×MLnac. In this way, generation of an unnecessarily long reply message can be avoided.

Further, the retransmission request message included in the reply message may include retransmission requests only for part of unreceived data. That is, the reply message may include part of the retransmission requests. In this case, the retransmission requests can be made for blocks extracted at random from the data that has not been received. This increases the probability that blocks that have not been received and that were not included in retransmission requests from a receiver are included in retransmission requests from other receivers, thereby increasing the probability that all the blocks can be received in a few repetitions.

Further, the data communication method of the invention comprises the steps of: receiving data; receiving a maximum message length and a backoff time of a reply message to be returned in response to the receipt of the data; generating the reply message having a length of up to the maximum message length for blocks that could not be received in the data; generating a transmission timing for the reply message at random within the backoff time; and transmitting the reply message with the transmission timing. According to this data communication method, the reply messages that meet the assumption of the sender mentioned above can be transmitted.

The blocks for which retransmission requests are to be made in the reply message are extracted at random from the blocks that could not be received.

In the above-mentioned data communication method, the data blocks transmitted or received may be clusters including original blocks into which the data has been divided and parity blocks generated from the original blocks, and the number of the retransmission requests included in the reply message may correspond to the number of required parity blocks for each cluster. That is, the invention can also be used when FEC (Forward Error Correction) is used.

The method of the invention can also be conceived as a system or a program.

BRIF DESCRIPTION OF THE DRAWINGS

DETAILED DESCRIPTION OF THE INVENTION

Figure 1:
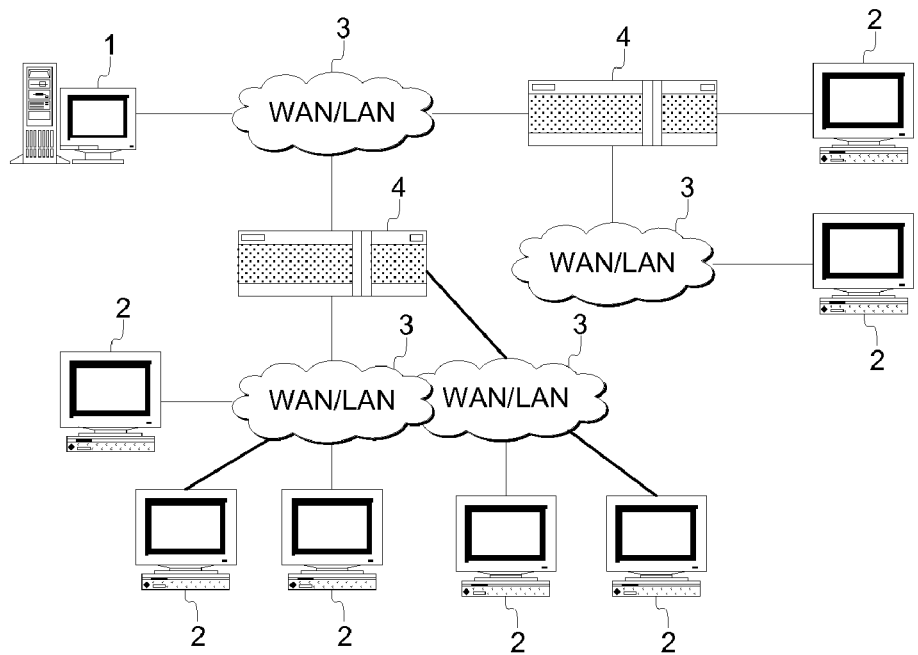
FIG. 1 is a diagram showing an example of a data communication system of an embodiment of the invention.

Now, an embodiment of this invention will be described below in detail based on the drawings. However, this invention can be practiced in various modes and should not be considered as being limited to the description of this embodiment. Throughout the description of the embodiment, like reference numerals will be applied to similar elements.

While the following embodiment describes mainly a method and a system, the invention can also be implemented as a program executable on a computer, as will be apparent to those skilled in the art. Accordingly, the invention can be embodied in hardware, software, or a combination of hardware and software. The programs can be recorded on any computer readable medium, such as a hard disk, a CD-ROM, an optical storage device, or a magnetic storage device.

Further, in the following embodiment, common computer systems can be used as a sender system and receiver systems. The computer systems that can be used in this embodiment have hardware resources similar to those generally provided in computer systems, such as a central processing unit (CPU), main memory (RAM), nonvolatile storage (ROM), a coprocessor, a graphics accelerator, cache memory, an input/output (I/O) controller. The computer systems can also have external storage devices such as a hard disk and communication means connectable to networks such as the Internet. The computer systems include various computers, such as a personal computer, a workstation, and a mainframe computer. The computer systems also have appropriate communication means for connection to communication networks such as the Internet.

FIG. 1 shows an example of a data communication system as an embodiment of the invention. In this data communication system, broadcast data is sent to systems of receivers 2 from a system of a sender 1. The broadcast data is sent to the receivers 2 from the sender 1 through WANs/LANs 3 such as the Internet or intranets while being routed to the destinations by routers 4. As shown, the WANs/LANs 3 are connected in any manner, and the routers 4 can also be arranged in any manner in the network. That is, the system of this embodiment is not limited to a network topology. While the network is illustrated here as the Internet or intranets, the network is not limited to them. The sender 1 and the receivers 2 may be connected through a leased line or the like.

Figure 2:
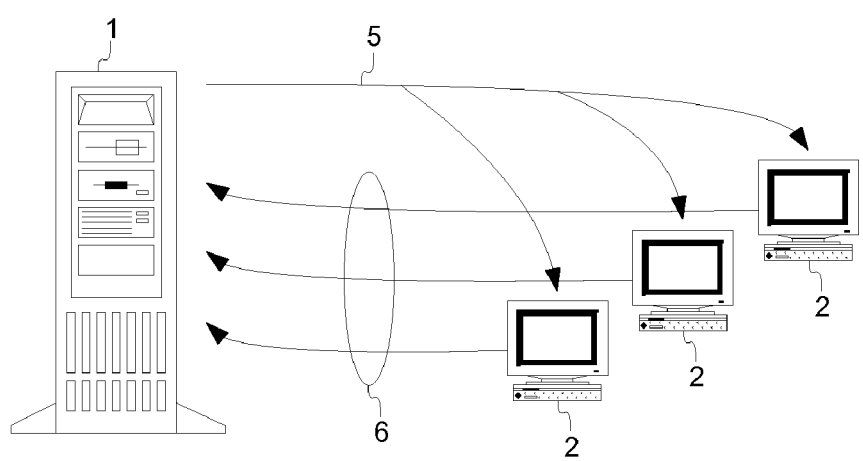
FIG. 2 is a conceptual view showing the overview of data communication of the embodiment of the invention.

FIG. 2 is a conceptual rendering showing the overview of data communication of this embodiment. The broadcast data from the sender 1 to the receivers 2 is sent through a transmission line 5. Even when there are a plurality of receivers, the sender 1 can broadcast data to the receivers in a single transmission. In this embodiment, the sender 1 receives a reply message from each receiver 2 to enhance reliability of transmission. The reply messages are returned to the sender through return lines 6. The illustrated transmission line 5 and the return lines 6 are conceptual and do not represent physical lines. In FIG. 1 for example, the WANs/LANs 3 and the routers 4 as well as the physical lines connecting them correspond to the transmission line 5 and the return lines 6.

The broadcast data sent through the transmission line 5 is content data or control data broadcasted from the sender 1. Receipt acknowledgement requests and retransmission data are also sent through the transmission line 5. The reply messages returned through the return lines 6 are receipt acknowledgements or retransmission requests, for example. Each receiver 2 sends a reply message, so that the sender 1 receives the reply messages corresponding to the number of the receivers 2. Broadcasting from the sender 1 to the receivers 2 is carried out as follows. First, the sender 1 sends, as packets, content data divided into blocks to a plurality of receivers 2. The receivers 2 receive the packets. The receivers 2 may not receive all the packets, because communication lines generally cause errors. Therefore, the sender 1 sends a receipt acknowledgement request to the receivers 2 to which the data has been sent. Each receiver 2, which received the receipt acknowledgement request, returns a receipt acknowledgement (ACK) message to the sender 1 if it has received all the packets. If it has some lost packets, it returns retransmission requests (NACK) for the lost packets to the sender 1. The sender 1, which received the reply messages retransmits the lost packets to the receivers 2 except those which have sent a receipt acknowledgement. This procedure is repeated until the sender 1 receives the receipt acknowledgements from all the receivers 2. Thus, highly reliable broadcasting is provided.

The concept of broadcasting includes both of multicast communication to specific destinations (receivers 2) and broadband-cast communication to unspecific destinations.

Figure 3:
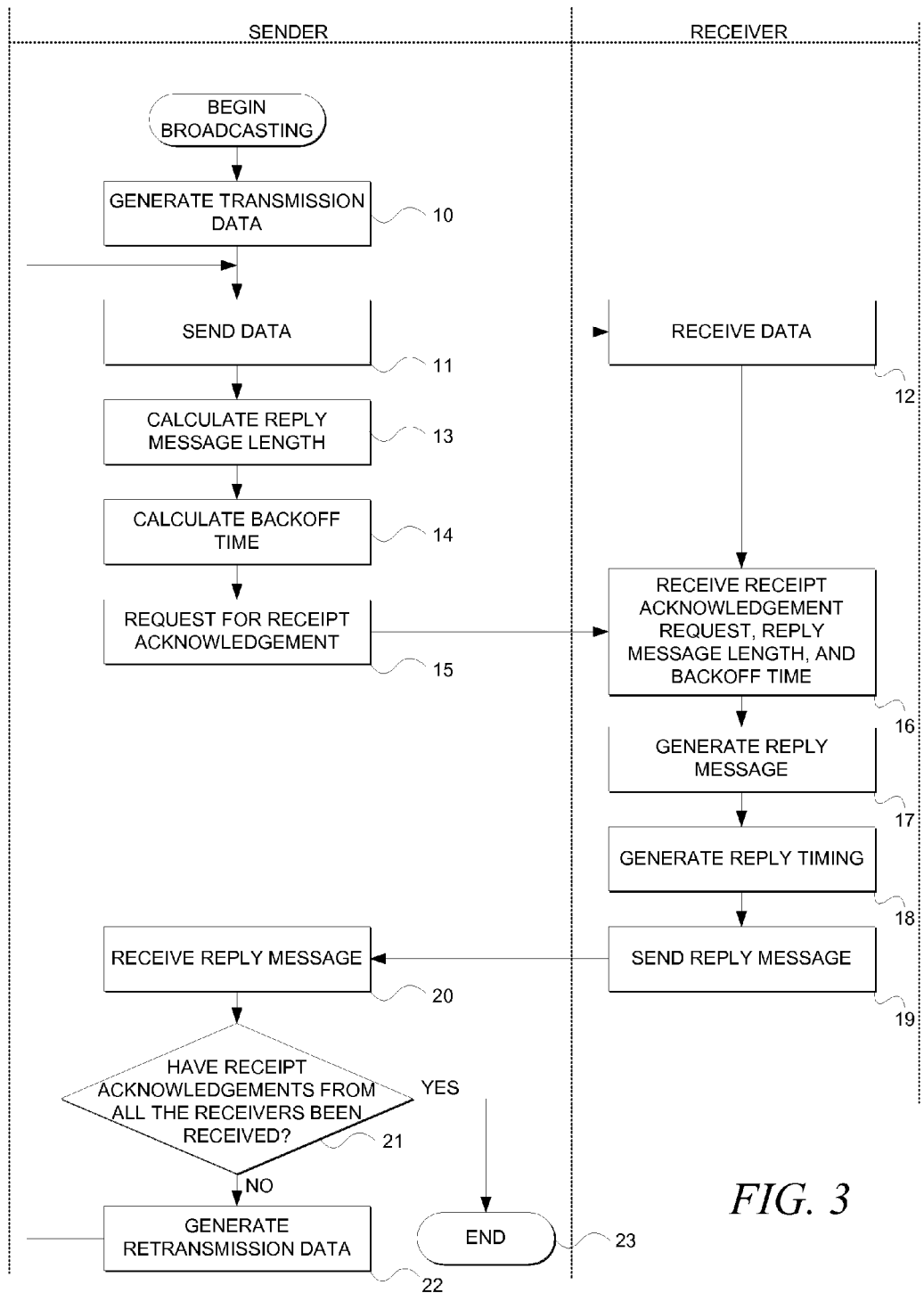
FIG. 3 is a flowchart showing an example of a data communication method of the embodiment of the invention.

FIG. 3 is a flowchart showing an example of a data communication method of this embodiment. The data communication method of the embodiment is characterized in that the sender 1 informs each receiver 2 of a message length and a backoff time to be assigned to the receivers 2, and each receiver 2 generates and sends a reply message according to the conditions of the message length and the backoff time so that communication with high reliability and high efficiency is provided.

First, the sender 1 generates sending data (step 10). The sending data is generated in packets by dividing content data into blocks and attaching a header to each block. Here, a block is a data unit by which retransmission requests are made.

Next, the sender 1 sends the generated data (packets) to the receivers 2 (step 11). The data transmission technique is well known. The data sent from the sender 1 is received by the receivers 2 (step 12). Although the illustrated flowchart shows only one receiver, naturally there are a plurality of receivers 2. Further, naturally the packets and the number of the packets received may vary among the receivers.

The sender 1 that has sent the data then calculates the reply message length (step 13) and the backoff time (step 14). The calculation of the reply message length and the backoff time involves taking into consideration the number of receivers assumed to return a reply message, the number of the transmitted blocks, the available bandwidth, the size of an allowed, substantial reply message, and so on.

Thus, the calculation of the reply message length involves taking into consideration the total amount of possible retransmission requests to be returned from all the receivers. That is, the number of blocks that may be requested to be retransmitted does not exceed the number of the transmitted blocks. Conventionally, if there are lost blocks that a receiver 2 failed to receive, the receiver 2 would include requests for all the lost blocks in a retransmission request message and send it independently of requests by other receivers. As a result, the retransmission request messages received by the sender 1 would include redundant retransmission requests for same blocks. For example, assuming 10000 sending blocks, 1% error rate, and 5000 receivers, the sender 1 would receive retransmission requests for 500000 blocks. However, the effective retransmission requests are equal to or less than 2%, since 10000 blocks have been actually transmitted. That is, the retransmission requests for the 490000 blocks can be said as unnecessary after all.

Therefore, in this embodiment, retransmission requests (allocation) for each receiver is defined as below, taking into consideration that there is no need to receive all the retransmission requests and that the total amount of valid retransmission requests is on the order of the number of the transmitted blocks.

Thus, the number of blocks for retransmission requests to be received by the sender is:

(the number of blocks for retransmission requests)=C×(the number of transmitted blocks).

wherein, C is a parameter to control effectiveness of retransmission requests and probability of uncollected retransmission requests. For example, if C is 0.5, blocks for retransmission requests half as many as the transmitted blocks are collected. In this case, the probability of uncollected retransmission requests is equal to or more than 50%, but the effectiveness of the retransmission requests increases. On the other hand, if C is 2, blocks for retransmission requests twice as many as the transmitted blocks are collected. In this case, the probability of uncollected retransmission requests decreases, but the effectiveness is equal to or less than 50%. Although uncollected retransmission requests are assumed to be included in the next retransmission as will be described later, it is preferable that retransmission is repeated as fewer times as possible. An appropriate value is chosen for C to minimize retransmission times depending on network characteristics.

Here, as an example, the number of blocks for retransmission requests is obtained with an exemplary scheme of multiplying the number of transmitted blocks by the constant C.

However, any scheme for defining an upper limit in association with the number of transmitted blocks may be employed. Generally, this may be expressed as a function F with its variable being the number of transmitted blocks:

(the number of blocks for retransmission requests)=F { (the number of transmitted blocks)}. wherein, F{x} indicates that the function F is a function of x.

If the number of blocks for retransmission requests to be collected by the sender 1 is determined as described above, the total amount of the blocks (the total amount of the data) is:

(the total amount of blocks for retransmission requests)= (the number of blocks for retransmission requests)×(an average length of a retransmission request per block).

This total amount, divided by the number of receivers, provides the amount of data on retransmission requests permitted for each receiver:

(the amount of retransmission requests per receiver)=(the total amount of blocks for retransmission requests)/(the number of receivers).

Because a header is generally attached to a reply message, the reply message length is the above-mentioned amount of retransmission requests per receiver plus the header length:

(the reply message length)=(the header length)+(the amount of retransmission requests per receiver).

In this manner, the reply message length can be calculated.

On the other hand, the total amount of the reply messages to be returned to the sender 1 is:

(the total amount of the reply messages)=(the reply message length)×(the number of receivers).

Therefore, the backoff time that enables optimal utilization of the bandwidth of the network used is:

(the backoff time)=(the total amount of the reply messages)/(the bandwidth).

Thus, the backoff time can be calculated.

The above description is expressed in the following equations:

$$Lrm = Lh + C \times Nsb \times MLnac/Nr, \text{ and}$$

$$Tbo = Lrm \times Nr/BW$$

wherein, Lrm is the allowable reply message length, Lh is a header length of a reply message, C is a constant, Nsb is the number of transmitted blocks, MLnac is an average message length of a retransmission request per block, Nr is the number of the receivers, Tbo is the backoff time, and BW is the bandwidth of the communication route.

In the above calculation, if messages other than retransmission requests are to be included in a reply message, naturally the lengths of such messages is to be added to the reply message length. In addition, a receipt acknowledgement may be regarded as a retransmission request for 0 block.

The sender 1 sends a receipt acknowledgement request (POLL) including the reply message length and the backoff time calculated in the above-described manner (step 15).

Figure 4:
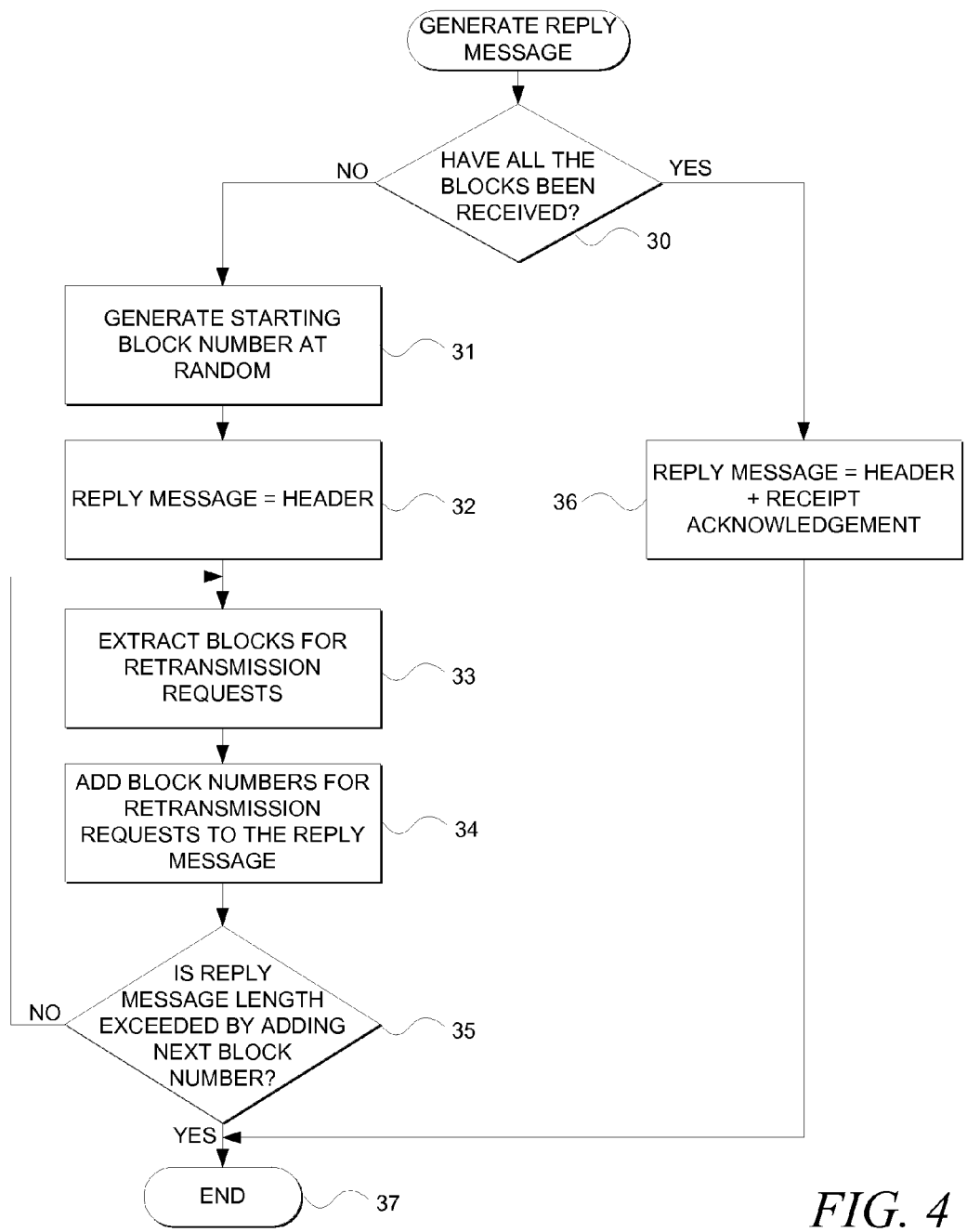
FIG. 4 is a flowchart showing an example of generating a reply message.

The receivers 2 receive the receipt acknowledgement request, the reply message length, and the backoff time (step 16), and they generates a reply message with a length of up to the received reply message length, which is to be returned within the received backoff time (step 17). FIG. 4 is a flowchart showing an example of generation of a reply message. Each receiver 2 determines (step 30) whether it has received all the blocks (packets) with regard to the data received at step 12. If it has not received all the blocks (no at step 30), it generates a starting block number at random (step 31). Then, it attaches a header to the reply message (step 32), and extracts blocks for retransmission requests (step 33). The blocks for retransmission requests are the blocks that could not be received (lost blocks). The extraction begins with the starting block number generated at step 31. Thus, the sender determines whether a block is lost or not beginning with the block of the starting block number. If the block is lost, the sender extracts it (step 33) and adds the block number to the reply message as one of the blocks for retransmission requests (step 34). If the block is not lost, the extraction transfers to the next block.

At step 35, a determination is made whether the addition of the next block number will cause the reply message to exceed the specified length (step 35). If it is no, the processing returns to step 33 and continues the extraction of blocks for retransmission requests. If it is yes at step 35 (if it is determined that the reply message will exceed the specified length), the processing terminates (step 37).

On the other hand, if the determination is yes at step 30 (if all the blocks have been received), a reply message is formed with a header+ a receipt acknowledgement (step 36), and the operation terminates (step 37).

In this manner, a reply message having a length of up to the specified reply message length can be generated. Further, the random generation of the starting block number at step 31 allows the block numbers for retransmission requests generated by all the receivers to be reasonably dispersed among the receivers. This increases the probability that the numbers of lost blocks that each receiver could not include in its reply message are included in the reply messages of other receivers, and increases the effectiveness of retransmission requests returned to the sender 1. Here, the effectiveness refers to the proportion of the blocks other than redundant blocks to all the blocks for retransmission requests to be returned to the sender 1.

Here, the above technique of random generation of the starting block number and sequential extraction has been described as the technique for extracting blocks for retransmission requests to be included in a reply message of each sender at random from actually required lost blocks. However, the extraction is not limited to this technique. For example, a list of lost blocks may be generated, from which the necessary number of blocks are extracted at random. Further, while the configuration of random extraction of blocks for retransmission requests to be included in a reply message is described in this embodiment, this is not a necessary configuration for the invention. If blocks are not extracted at random, the effectiveness can be a lower. However, randomization can be assumed to a certain extent without randomization in the above-mentioned extraction process, because lost blocks essentially occur at random.

Next, the receivers 2 generates a reply timing at random within the specified backoff time (step 18). Then, they sends the generated reply message with the reply timing (step 19).

As such, the reply messages returned by the receivers 2 have a length limited in advance, and the total amount of the reply messages are predetermined from the assumed number of receivers. Further, the backoff time is set so that all the reply messages of predetermined amount can be most efficiently received. Thus, the best performance of the communication lines can be achieved, and the effectiveness of communication can be increased with appropriate use of the lines. That is, there is no overflow in the communication lines nor redundant backoff time (waste of the communication lines), both of which have been the problems in the prior art. Further, the embodiment enables effective use of the lines without assuming the error rate of communication. Still further, the total amount of reply messages itself is reduced, since redundant blocks included in the reply messages are made as few as possible. Thus, the data communication method of the embodiment is more effective as the number of receivers increases.

The sender 1 receives the reply messages (step 20) and determines whether it has received the receipt acknowledgements (ACK) from all the receivers (step 21). If the sender 1 has not received the receipt acknowledgements from all the receivers, it generates retransmission data to retransmit blocks for retransmission requests (step 22). Then, it returns to step 11 to repeat the above-described steps. The retransmission data is not sent to those receivers that have returned the receipt acknowledgements. Therefore, the number of receivers to which data has to be retransmitted is reduced, the reply message length calculated next at step 13 becomes longer, and the backoff time calculated at the next step 14 becomes shorter. Accordingly, as retransmission is repeated, the Takt time becomes shorter and the number of uncollected blocks for retransmission requests is reduced. That is, the reply message length and the backoff time are dynamically calculated for each transmission or reply, and controlled with optimal conditions each time.

If it is determined that the receipt acknowledgement has been received from all the receivers at step 21, the data communication (broadcasting) of the embodiment terminates (step 23).

According to the embodiment, the optimal reply message length and backoff time are calculated for each data transmission or retransmission, and based on these conditions, each receiver generates a reply message. That is, the conditions are optimally controlled for each data transmission (reply). This enables optimal and effective use of the communication lines. Further, this enables broadcasting with high reliability and efficiency without causing overflow or waste of lines. Further, in this embodiment, the amount of the reply messages received by the sender is reduced since the reply messages from the receivers have limitation. This can reduce load on the return lines. Further, according to the embodiment, it is not necessary to assume the error rate. The reason is that the amount of retransmission requests collected at a time is limited so that a high error rate can be addressed by increasing the retransmission times and the unused bandwidth at a low error rate can be minimized instead.

Figure 5:
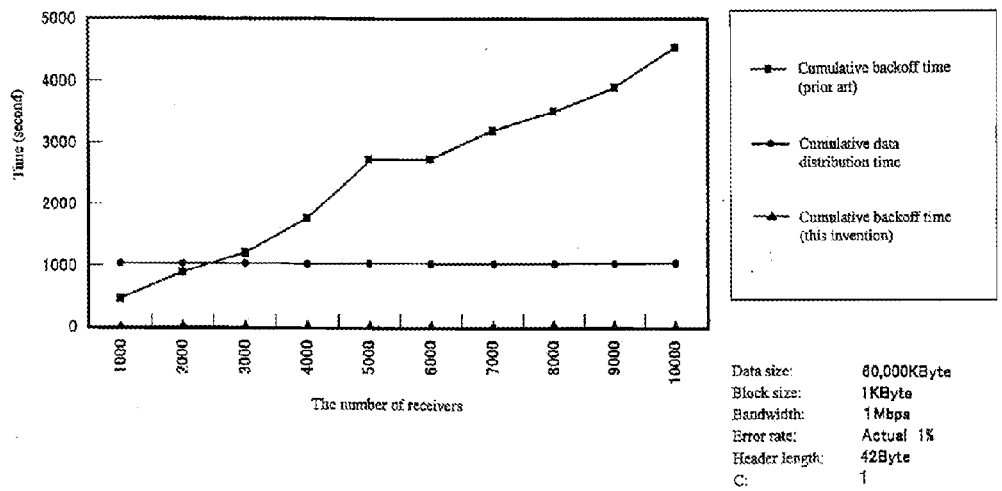
FIG. 5 is a graph showing results of simulative calculation of a backoff time for the embodiment and a prior art.
Figure 6:
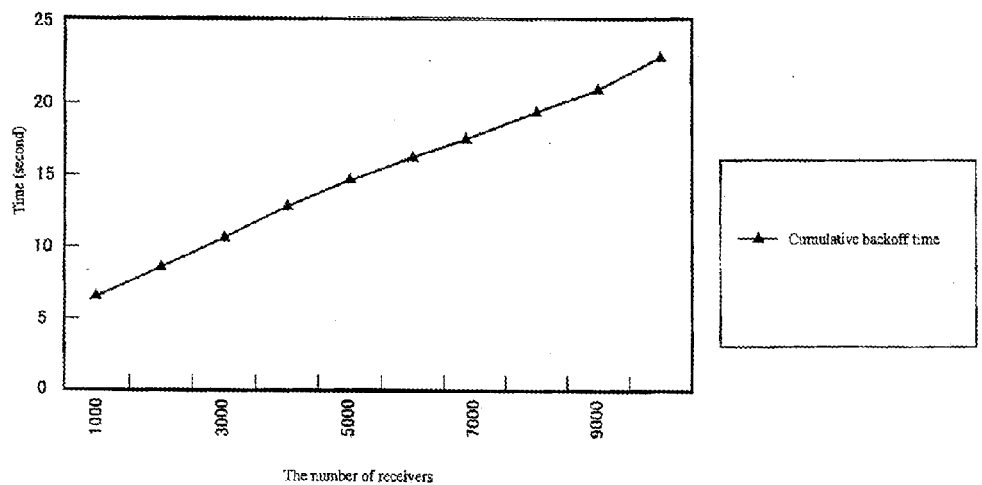
FIG. 6 is a vertically enlarged graph of FIG. 5.

FIGS. 5 and 6 are graphs showing results of simulative calculation of the backoff time for this embodiment and a prior art. The vertical axis indicates time (in second), and the horizontal axis indicates the number of receivers. The simulation conditions were set as follows: the transmission data size of 60 MBytes, the block size of 1 KByte, the bandwidth of 1 Mbps, the actual error rate of 1%, the header length of 42 Bytes, and C=1. The assumed error rate in the prior art was set to be 10%. A plot shown with black dots are cumulative time spent on data distribution. The data distribution time is substantially constant regardless of the number of receivers. On the other hand, the cumulative backoff time increases as the number of the receivers increases. However, the cumulative backoff time for the prior art (plotted with black squares) is as much as 4500 seconds for 10000 receivers, which is more than four times longer than the cumulative time spent on data distribution. On the other hand, the cumulative backoff time for this embodiment (plotted with black triangles) is negligible relative to the data distribution time. FIG. 6 is an enlarged graph of the vertical axis of FIG. 5, in which the cumulative backoff time is only a little more than 20 seconds for 10000 receivers. Thus, the data communication method of this embodiment can remarkably reduce the backoff time. This means that it takes almost only the data distribution time in total to complete communication. This is remarkably effective especially in large-scale broadcasting for a great number of receivers.

Figure 7:
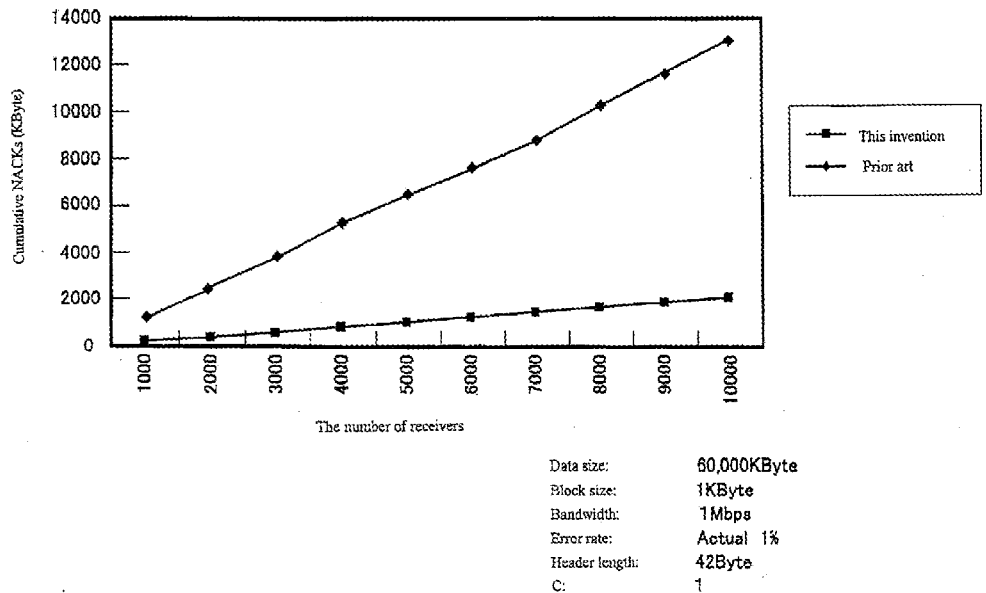
FIG. 7 is a graph showing a result of simulative calculation of cumulative retransmission requests (NACKs) for the embodiment and a prior art.

FIG. 7 is a graph showing a result of simulative calculation of cumulative retransmission requests (NACKs) for this embodiment and a prior art. The simulation conditions are same as the foregoing. For both of the embodiment and the prior art, the cumulative NACKs increase as the number of receivers increases. However, while the cumulative NACKs for the prior art (plotted with black rhombuses) reaches 13000 KBytes for 10000 receivers, it is only 2000 KBytes for this embodiment (plotted with black squares). That is, in this embodiment, the amount of NACKs is reduced to about ⅙ of the amount in the prior art.

The invention has been specifically described above based on one of the embodiment. However, the invention is not limited to the embodiment but various modifications can be made without departing from the spirit thereof.

Figure 8:
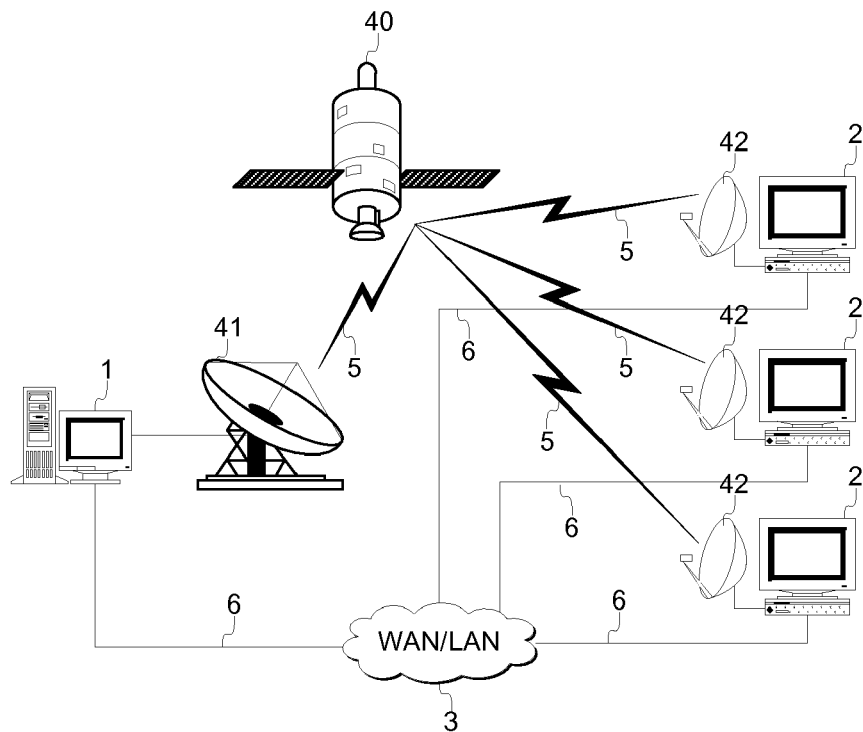
FIG. 8 is a diagram showing another example of the data communication system.
Figure 9:
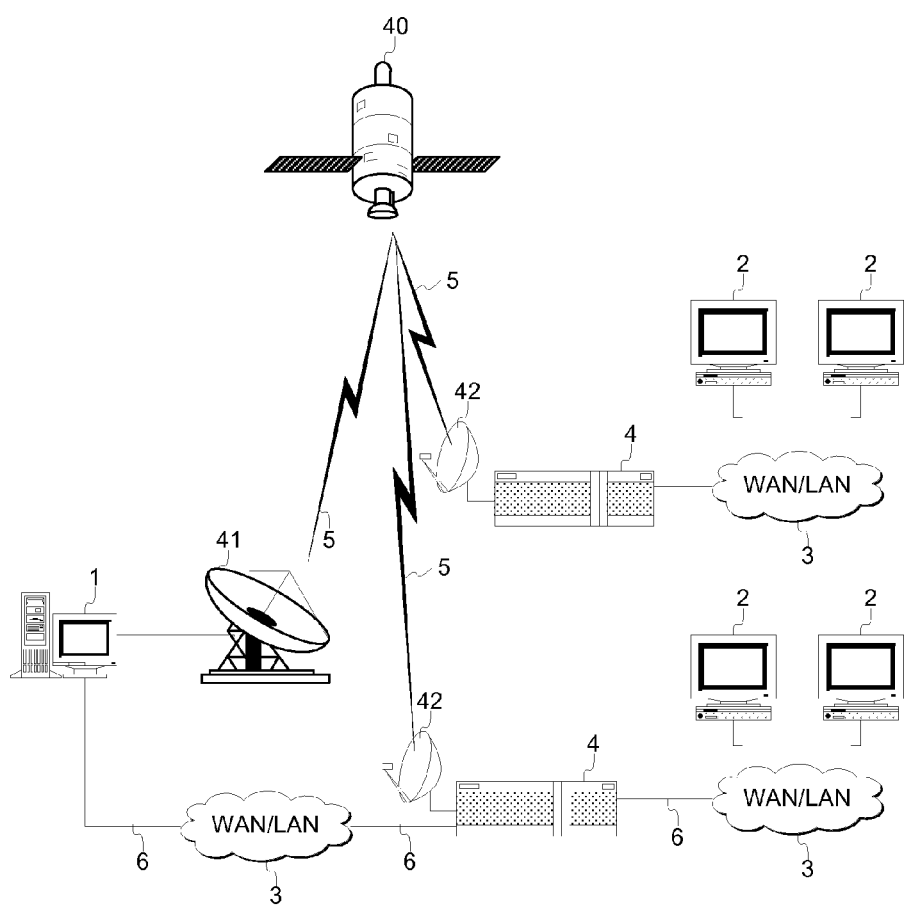
FIG. 9 is a diagram showing still another example of the data communication system.

For example, the transmission line 5 may be realized with satellite broadcasting as shown in FIG. 8. In this case, the system includes a satellite 40, a satellite transmission facility 41, and a satellite reception facility 42. Terrestrial lines using LAN/WAN 3 can be used as the return lines 6. Alternatively, a combination of satellite lines and terrestrial lines may be used as shown in FIG. 9. In this case, the return lines 6 may be terrestrial lines as in FIG. 8.

Further, while the above embodiment has been illustrated with the example in which data is divided into blocks and a block is a unit by which retransmission requests are made, the invention is not limited to this example. For example, if FEC is used, data is divided into blocks, and a plurality of parity blocks are generated from some of (k number of) the original blocks, then these original blocks and the parity blocks are combined as a cluster (including k' blocks (k'>k)), which is a unit of transmission. In this case, a cluster is a unit by which retransmission requests are made. The retransmission requests does not include block numbers, but they are retransmission requests for the parity blocks corresponding to the number of lost blocks.

Further, while the above embodiment has been illustrated with the example in which the sender 1 sends a receipt acknowledgement request and the receivers 2 receive it and generate a reply message, the receipt acknowledgement request may be not always necessary. For example, the receivers may send a reply message (or start a timer for the backoff time) according to a given promise such as a timeout without receipt of control packets for an acknowledgement request. Further, the data such as the backoff time may be embedded in the data packets.

Further, while the above embodiment has been illustrated with the example of block numbers as the means for specifying blocks in retransmission requests, this invention in not limited to this example. For example, any expression that can specify blocks to be retransmitted may be naturally employed, such as bitmap, run-length, and so on.

The main aspect of the invention disclosed herein provides the following advantages. The total amount of reply messages in broadcasting can be reduced. Further, the bandwidth of a communication route can be effectively utilized without assuming the error rate. Still further, techniques for realizing broadcasting with high reliability and efficiency can be provided.

The invention claimed is:

1. A data communication method comprising the steps of:
broadcasting data to a plurality of receivers;
calculating a maximum message length and a backoff time of reply messages to be returned from the receivers in response to the broadcasted data, wherein a total amount of data of the reply messages from all the receivers is predetermined, then the maximum message length is calculated by dividing the total amount of data of the reply messages from all the receivers by a number of the receivers, and the backoff time is calculated by dividing the total amount of data of the reply messages from all the receivers by a bandwidth of a communication route, wherein the total amount of data of the reply messages minus lengths of their headers is calculated from a number of broadcasted blocks of the data and wherein each reply message is a receipt acknowledgement message or a retransmission request message, the maximum message length Lrm is calculated based on the following equation $$Lrm = Lh + F(Nsb) \times MLnac/Nr, \text{ and}$$

the backoff time Tbo is calculated based on the following equation $$Tbo = Lrm \times Nr/BW,$$

in which Lh is a header length of the reply message, F is a function defining an upper limit of a number of blocks for retransmission with a variable Nsb, Nsb is the number of the broadcasted blocks, MLnac is an average message length of a retransmission request per block, Nr is the number of the receivers, and BW is the bandwidth of the communication route;

sending the maximum message length and the backoff time to the receivers; and receiving from respective receivers respective reply messages sent at any time within the backoff time and having a length equal to or less than the maximum message length.

2. The data communication method according to claim 1, wherein $$F(Nsb) = C \times Nsb$$

in which C is a constant.

3. The data communication method according to claim 1, wherein an allowable message length with a maximum of Lpmax and a minimum of Lpmin is defined for the reply messages, the maximum message length Lrm is modified as Lrm = Lpmax if Lrm is above Lpmax, the maximum message length Lrm is modified as Lrm = Lpmin if Lrm is below Lpmin, and the maximum message length Lrm is modified as Lrm = Lworst if Lrm is above the message length Lworst, which is a longest reply message length among combinations of lost blocks of the data.

4. The data communication method according to claim 1, wherein the reply message includes a retransmission request message, and the retransmission request message includes retransmission requests only for part of unreceived portions of the data.

5. The data communication method according to claim 4, wherein the retransmission requests are made for blocks extracted at random from the unreceived portions of the data.

6. A data communication method comprising the steps of:

receiving data;

receiving a maximum message length and a backoff time of a reply message to be returned in response to the receipt of the data, wherein a total amount of data of the reply messages from all the receivers is predetermined, then the maximum message length is calculated by dividing the total amount of data of the reply messages from all receivers by a number of receivers, and the backoff time is calculated by dividing the total amount of data of the reply messages from all the receivers by a bandwidth of a communication route, wherein the total amount of data of the reply messages minus lengths of their headers is calculated from a number of broadcasted blocks of the data and wherein each reply message is a receipt acknowledgement message or a retransmission request message, the maximum message length Lrm is calculated based on the following equation $$Lrm = Lh + F(Nsb) \times MLnac/Nr, \text{ and}$$

the backoff time Tbo is calculated based on the following equation $$Tbo = Lrm \times Nr/BW,$$

in which Lh is a header length of the reply message, F is a function defining an upper limit of a number of blocks for retransmission with a variable Nsb, Nsb is the number of the broadcasted blocks, MLnac is an average message length of a retransmission request per block, Nr is the number of the receivers, and BW is the bandwidth of the communication route;

generating the reply message having a length equal to or less than the maximum message length for blocks that could not be received in the data;

generating a transmission timing for the reply message at random within the backoff time; and transmitting the reply message with the transmission timing.

7. The data communication method according to claim 6, wherein blocks for which retransmission requests are to be made in the reply message are extracted at random from the blocks that could not be received.

8. The data communication method according to claim 1, wherein blocks of the data transmitted or received are clusters including original blocks into which the data has been divided and parity blocks generated from the original blocks, and a number of the retransmission requests included in the reply message corresponds to the number of required parity blocks for each cluster.

9. The data communication method according to claim 6, wherein blocks of the data transmitted or received are clusters including original blocks into which the data has been divided and parity blocks generated from the original blocks, and a number of the retransmission requests included in the reply message corresponds to the number of required parity blocks for each cluster.

* * * * *